United States Patent Office 3,440,656
Patented Apr. 22, 1969

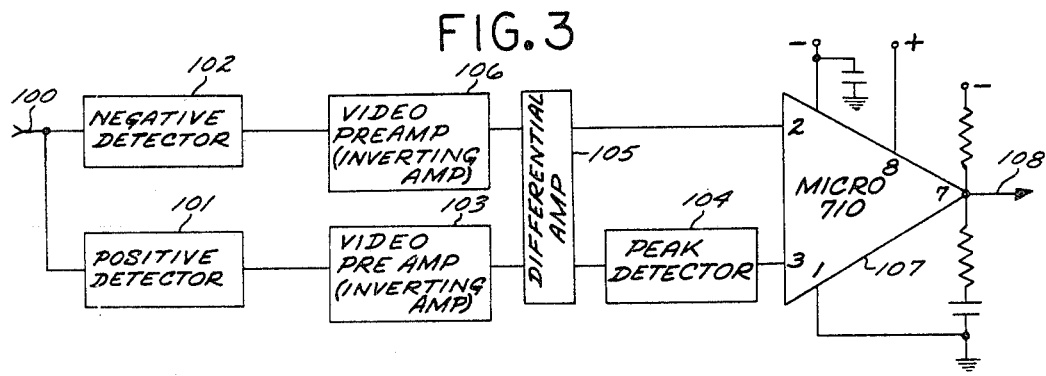
FIG. 3
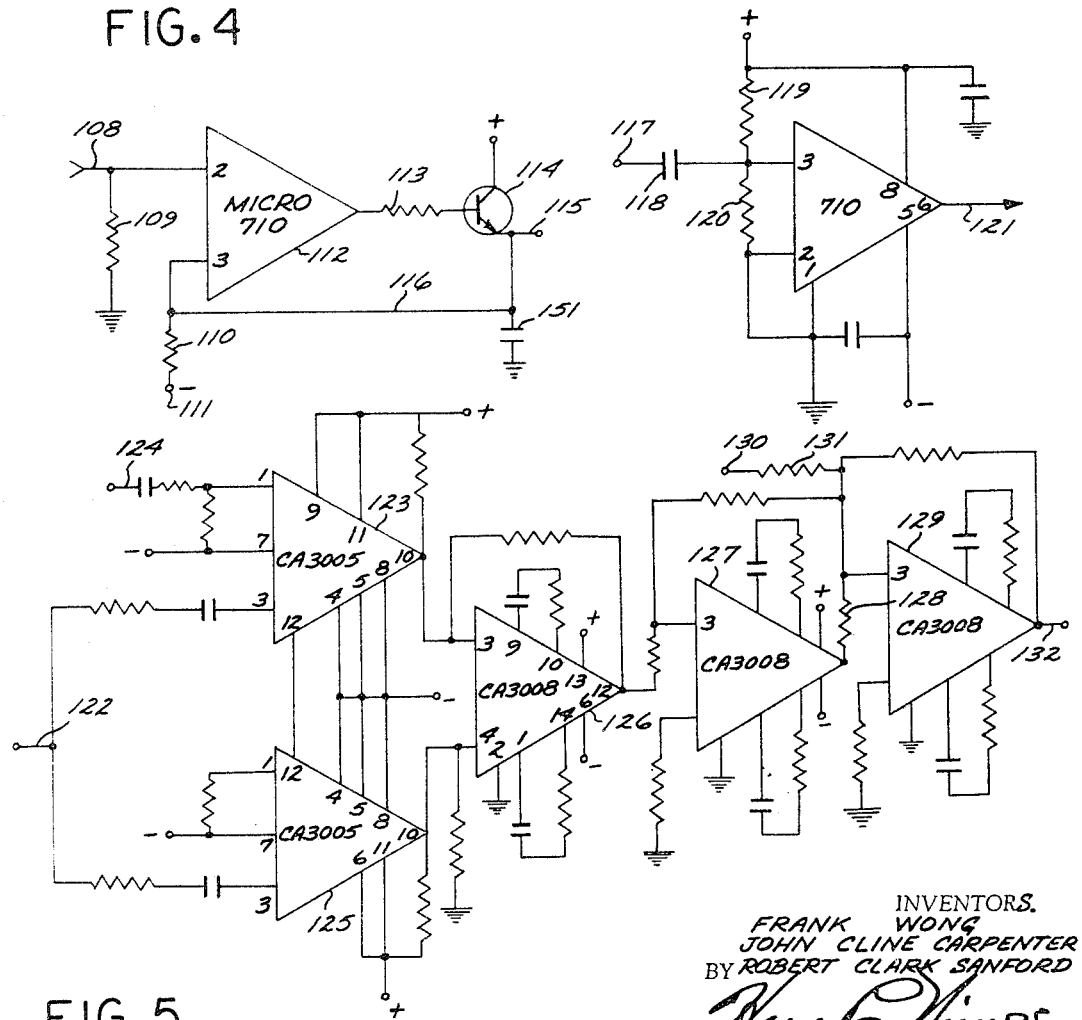
FIG. 4
FIG. 6
FIG. 5

3,440,656
SIGNAL EVALUATION SYSTEMS
Frank Wong, Los Angeles, John Cline Carpenter, Reseda, and Robert Clark Sanford, Costa Mesa, Calif., assignors, by mesne assignments, to Babcock Electronics Corporation, Costa Mesa, Calif., a corporation of Delaware
Filed June 12, 1967, Ser. No. 645,411
Int. Cl. G01s 5/04
U.S. Cl. 343—121                              15 Claims

ABSTRACT OF THE DISCLOSURE

The accompanying application describes a system sensitive to a number of electrical input signals which have the same shape and occur at the same time, but which differ in amplitude, and which provides an output signal which by its duration may be interpreted as the vector direction of the composite of the state of a condition in segments of compass direction represented by the several input signals. Such a system has obvious application in locating the direction to a radio or radar transmitter and it is specifically described in this application as an element of an electromagnetic signal bearing and signature detection and recording system. Other elements of the larger system include apparatus for processing pulse duration, pulse repetition period, signal frequency, real or civil time, and true heading information and logic apparatus for arranging and recording that information.

---

This invention relates to signal evaluation systems. More particularly it relates to a system which responds to a number of substantially simultaneously received input signals of different magnitudes to produce an output signal which, when said signals are considered to represent direction information, provides a time signal whose duration is indicative of the vector direction of the composite of said signals. The invention further relates to direction analysis systems and to direction and signature analysis systems which incorporate the aforedescribed system.

A direction analysis system is one which determines the direction to some distant point from which electromagnetic radiations eminate. A direction and signature analysis system determines not only direction to the source but it determines attributes which characterize the radiations. Frequency, pulse repetition period in the case of pulses, and duration of transmission or pulse are signifiacnt attributes.

One object of the invention is to provide a novel system for comparing and representing the composite of a number of signals which occur substantially simultaneously and which differ from one another in magnitude. The invention provides a means for envisioning that each signal represents information that can be spacially related as angular segments forming a circle, and for determining the vector direction of the composite of the signals on that circle. It is an object of the invention to provide such a system for representing information.

While such a system has wider application than to resolve directions, and it is specificially noted that it is not limited to that application, none-the-less its function is less abstract and more readily envisioned in applications where the signals to be evaluated or compared represent information that is actually related to segments of direction in space about some reference point. For example, systems for determining the direction of a source of electromagnetic radiations often employ an antenna system comprising four antennas arranged such that each antenna is effective to receive signals from directions that lie in one quadrant of a horizontal plane in which the antenna are located at the origin or reference point. If radiation from the source is intercepted at one or more of them, the four antennas will provide output signals which are substantially simultaneous and differ only in magnitude (the magnitude of one or more may be zero). The invention will resolve those signals into a composite which defines a vector whose direction is the direction of the source of the signals. While the invention has much wider application, this application is a particularly useful one and to provide it is another object of the invention. Thus another object is to provide electromagnetic signal evaluation systems for determining direction of the signal source.

The output of the direction resolving system is especially well suited to combination with and control of signal signature identification and another object is to provide a novel signal direction and signature evaluation system.

These and other objects of the invention will be apparent in the detailed description that follows and in the accompanying drawing showing an embodiment of the invention, it being understood that various modifications may be made in this embodiment and that other embodiments are possible without departing from the invention.

In the drawings:

FIGURE 3 is a block diagram of the threshold detector employed in the system of FIGURE 1;

FIGURE 4 is a schematic diagram of a peak detector and pulse stretcher;

FIGURE 5 is a schematic diagram of a modulator, inverter, summer combination; and FIGURE 6 is a schematic diagram of a zero crossing detector.

Figure 1:
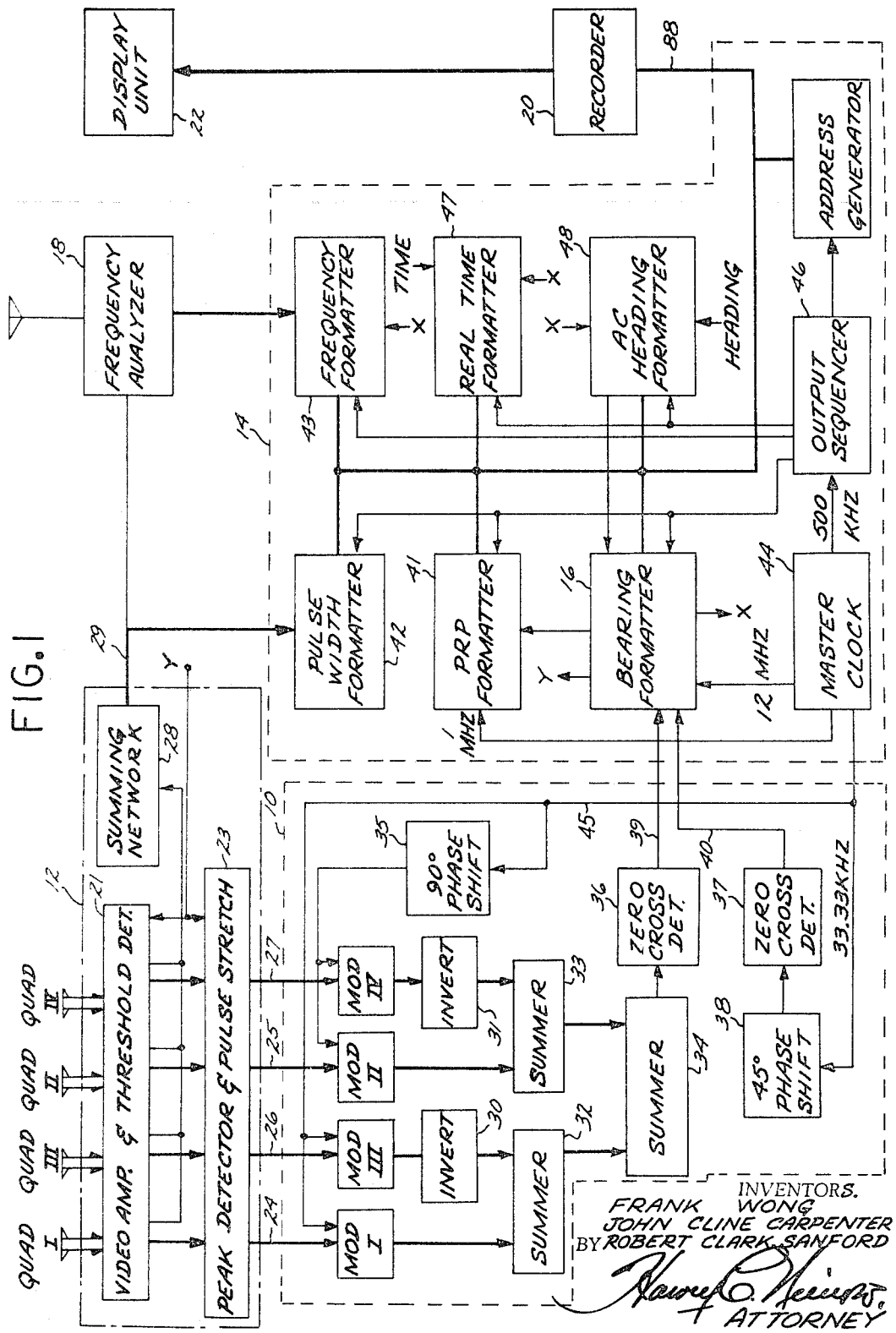
FIGURE 1 is a block diagram of an angle resolver and a signal evaluation system which incorporates it.

In FIGURE 1 the numeral 10 designates an angle resolver. This unit is adapted to receive some number of input signals simultaneously which differ substantially only in magnitude. Its output is a signal which indicates the composite amplitude of the signals stated vectorially. Thus it is a computer which treats a plurality of inputs as representing respectively the state of some condition in one segment of a polar domain and computers their vector sum and phase angle of the vector sum.

In the embodiment selected for illustration the angle resolver is incorporated in a system which is capable of receiving radio signals from a distant source in one or more of four antennas arranged so that each will receive signals arriving from a different one of four quadrants in a special or polar domain having compass direction orientation. Thus each antenna is sensitive to signals arriving from its individual 90 degree segment of compass direction. These antennas are designated as QUAD I, QUAD II, QUAD III and QUAD IV in FIGURE 1 and the numerals have the same meaning as they do by convention in polar and rectilinear graphs. The numerals I, II, III, and IV define successive quadrants occurring clockwise about an origin starting from the positive abscissa line. A radio signal originating at a distant source will usually be received simultaneously at all antennas. Means 12 are provided in the system for processing the antenna signals to minimize the adverse effects of noise prior to application to the angle resolver inputs. The significant parameter of the output signal is duration of a period and advantageously, as shown it comprises a pair of pulses the leading edge of one marking the beginning of the period and the leading edge of the other marking the end of the period.

In a system intended for the analysis of microwave signals such, for example, as radar signals, the quadrant antenna array is "wide-open" in that its design permits reception of a broad frequency range of signals from any direction and at any time. Advantageously, as indicated, the antennas each incorporate a positive and negative diode detector such that antenna output is suitable for amplification in the amplifiers of the video amplifier and threshold detector section 21. The function of this section is to amplify the respective input signals and to establish the threshold noise level to insure an adequate signal-to-noise ratio for further processing.

Output signals individualized to the quadrant antennas are then peak detected and the detected peaks are stretched in a peak detector and pulse stretcher section 23. The stretched output corresponding to the several quadrant antennas are then applied by lines 24, 25, 26 and 27 to the inputs of modulators designated MOD I, MOD II, MOD III, and MOD IV to indicate that they are associated with antennas QUAD I, QUAD II, QUAD III and QUAD IV respectively. A portion of each of the outputs of the video amplifier and threshold detector section 21 is added to the others in a summing network 28. The output at line 29 of this network has an amplitude representing their sum. The only requirement at this point is to get a signal of maximum amplitude. Summing serves this purpose. Thus the signal processor 12 includes a video amplifier and threshold detector 21, a peak detector and pulse stretcher 23 and a summing network 28. An input is provided at Y to disable the video amplifier and threshold detector to preclude passage of signals until a previously received signal has been processed in the data processor 14.

The input signals at lines 24, 25, 26 and 27 to the angle resolver occur at the same time and have the same shape except that they may differ in amplitude. Each of the input signals is modulated at the same frequency to produce an alternating signal at the output of the modulators I, II, III, and IV. Quadrants I and III are opposite one another and quadrants II and IV are opposite. Adjacent quadrants have 90 degree phase relation. Signals received from one source by the two opposite antennas must be subtracted to produce a resultant signal from that pair. To this end the output of one modulator in each opposite pair is inverted and the two outputs, one inverted and one not inverted, are added in a summer. The angle resolver 10 includes an inverter 30 in the MOD III output and an inverter 31 in the MOD IV output. The outputs of MOD I and inverter 30 are added in a summer 32 and the outputs of MOD III and inverter 31 are added in a summer 33.

The outputs of summers 32 and 33 are added in another summer 34. These two outputs represent by their amplitudes the magnitude of the received signal at each pair of opposed quadrant antennas. The two outputs have the same frequency but they differ in phase by ninety degrees because the modulated signal is shifted in ninety degree phase shifter 35 before application to MOD II and MOD IV. Consequently when the outputs of summers 32 and 33 are added in summer 34 the output of the latter is a signal whose magnitude and phase correspond to the vector sum of the input signals applied to the angle resolver 10. In this system the output of summer 34 represents by its phase the direction from whence radio signals to the antennas was received. The output of summer 34 is applied to a zero crossing detector 36. This device produces an output pulse when the input is zero and changing from negative to positive.

The modulated signal applied to the modulators I, II, III, and IV is also applied to a crossing detector 37 in the angle resolver to provide a reference pulse when the input crosses zero while going positive. The time between the pulses produced by the two crossing detectors 36 and 37 is a measure of the vector direction of the received radio signal. There is a need, of course, to locate the reference pulse in time such that it can be related to a reference in the domain or condition that is represented by the input signals to the angle resolver. To illustrate how this relation can be accomplished, it has been assumed that this signal identification system is portable and that its compass direction is changed from time to time as occurs in the case of airborne systems. In addition it has been assumed that the antenna system is oriented on the carrier (the aircraft) so that the line dividing quadrants I and II from quandrants III and IV is zero degrees relative to the aircraft with quadrants I and IV forward. Signals having equal amplitude and 90 degree phase relationship going into summer 34 will produce an output displaced forty-five degrees in phase from the modulated signal. To make the duration of the "start line" pulse from detector 36 to the "stop time" pulse from detector 37 correspond to vector or spatial direction measured from zero degrees relative direction, the phase of the modulator signal is shifted by forty-five degrees before application to detector 37 in a forty-five degree phase shifter 38. The direction is converted to true bearing later in the data processor 14.

The output signal from the angle resolver 10 is comprised of two signals in this embodiment. One, the start pulse, appears on output line 39. The other, the stop pulse, appears on output line 40.

These output signals are applied to a data processor 14 and in particular to the bearing formatter 16 of the processor. The output of the processor 14 is a series of signals which are digital in form and indicative respectively of: bearing of the radio signal source converted to true bearing; duration of the received radio signal assuming they are pulsed signals; pulse repetition period of the received radio signals assuming that they are pulse signals; the frequency of the received radio signals and; the time (civil or clock time) that the signals were received. As previously described, one signal input to the data processor is the pulse that marks the start of the angle signal. Another is the pulse that marks the end of the angle signal. A third input is the received radio signal (after amplification and detection) so that its duration can be measured. A fourth input is frequency information from a separate omnidirectional receiving system 18. Another input is civil or clock time and a sixth input, when the system is portable, is the compass orientation or heading of the quad antenna system.

The output signals are recorded in a recorder 20 and finally displayed in a display unit 21.

The general organization of the data processor is shown in FIGURE 1. The bearing formatter 16 converts the time duration input signals to digital signals representing bearing which go to the recorder 20 and to a pulse repetition period formatter 41 which measures the time between successive bearing formatter outputs and applies a digital signal representing that period to recorder 20. A pulse width formatter 42 receives its input from the summing network 28 by line 29 and converts this input to a digital signal representing the time length of the received radio signal pulse. A frequency formatter 43 receives information from analyzer 18 defining the frequency of the received radio or radar signal. This information is converted to digital form and applied to recorder 20. Pulse repetition period and pulse width are direct functions of time and bearing is determined as a function of time so the system includes a master clock. In the embodiment shown this unit forms an element of the data processor 14 and is designated by the numeral 44. This master clock is the source of the sinusoidal signal, at line 45, of the modulation signals applied to modulators I, II, III, and IV and to ninety dgree phase shifter 35 and to forty-five degree phase shifter 38.

The time signal furnished by clock 44 is advantageously 360 times the modulation frequency on line 45. The frequencies 12 mHz. and 33.33 kHz. are so related but these values need not be employed. This frequency relation is preferred because each cycle of master clock input in the time beween the turn on signal on line 39 and the turn off signal at line 40 represents one compass degree of bearing.

The clock 44 supplies time signals of 1 mHz. to the pulse repetition period formatter to establish metered times during which output signals may and may not be extracted from that formatter and it supplies signals of 500 kHz. to an output sequencer 46.

The outputs of the several formatters may not be applied to the recorder simultaneously. It is the function of the sequencer to apply switching signals to the several formatters in turn. Also in practice it may be, and usually will be, desirable to provide multiple channels for the analysis of signals from different sources or different signals from a single source. Thus, six channels might be provided in the several formatters and the master clock output times selected for illustration will readily accommodate six channel operation. However, incorporation of multiple channels introduces the need to relate bearing and signature information as the sequencer connects the formatters to the recorder. To this end the bearing formatter is made to provide a catalog signal by a line X to each of the other formatters which activates in each of them that channel which is active in the bearing formatter.

To record the clock time or civil time at which a record was made a real time formatter 47 is included. It receives time information which is digitized and supplied by channel, in view of the catalog signal at its input line X, to the recorder 20 in sequence. A true heading or aircraft heading formatter 48 is included. It receives aircraft heading information and converts it to a digital signal which may be applied directly to the recorder 20 or the bearing formatter for conversion from relative to true bearing, or both. Like the others, this formatter is provided with a catalog signal at X and its output is controlled by the sequencer 46. To enable location of the record on the recorder an address is advantageously added to the record. An address generator 49 is included in the system for this purpose and its operation is sequenced by the sequencer 46.

The signal input at Y to the video amplifier and threshold detector section 21 and peak detector 23 originates in the bearing formatter 16. This signal disables the section 21 from the time an ON signal is applied to the formatter at line 39 until a time sufficient for the formatter to process the signal when a reset signal is applied to detector 23.

Figure 2:
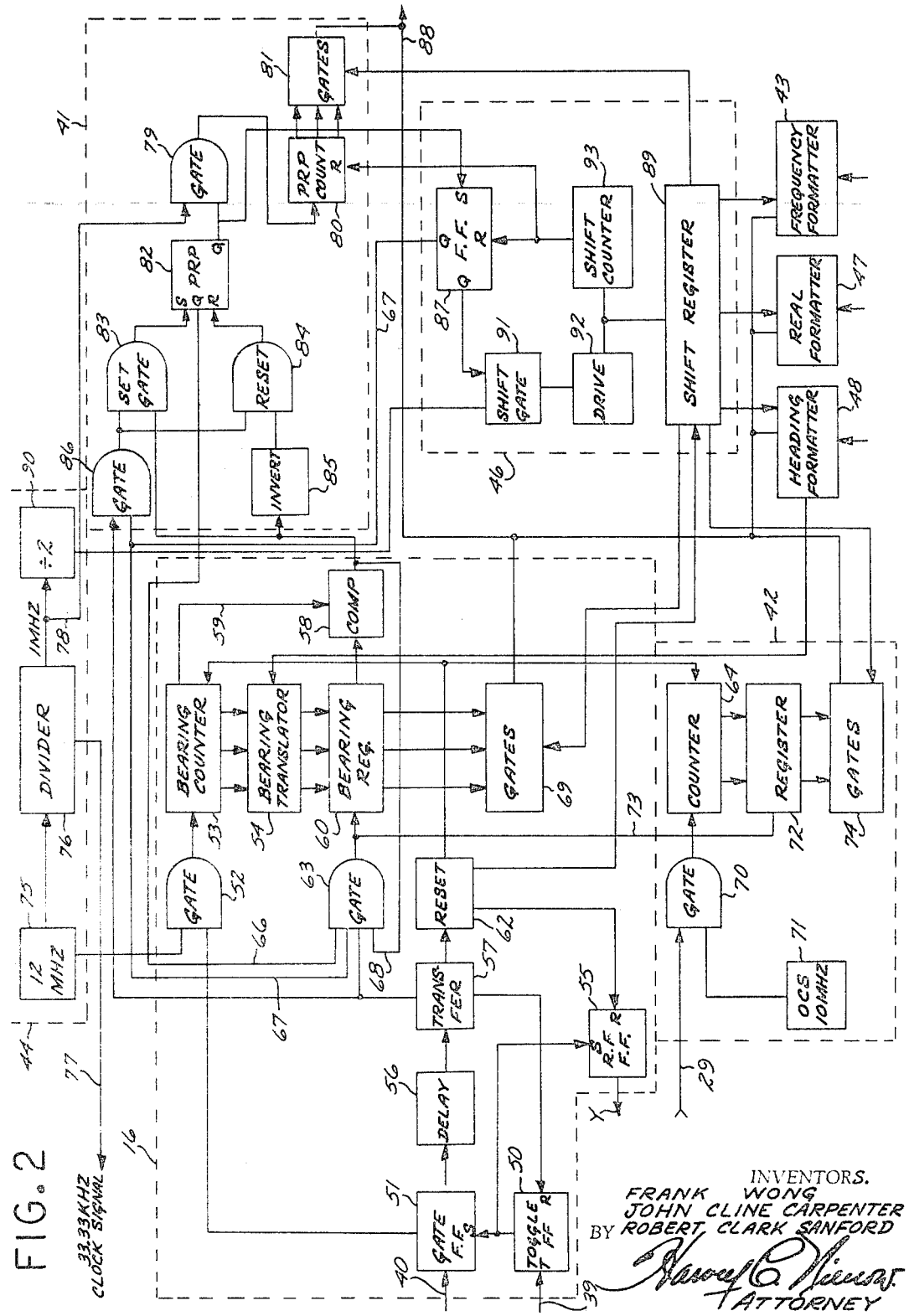
FIGURE 2 is a block diagram of a single channel data processor portion of the system of FIGURE 1 shown in greater detail.

The data processor is shown in greater detail in the logic diagram of FIGURE 2.

Whatever the condition of toggle flip-flop 50 at the first start time pulse on the input line 39, when the second pulse is applied by line 39 the flip-flop will be triggered. Its output becomes zero which sets flip-flop gate 51. The output from gate 51 enables the bearing counter gate 52, coupling the 12 mHz. clock signal to the counter 53 and the bearing count begins. The next zero crossing pulse on line 40 from the zero bearing reference detector 37, resets the gate flip-flop 51. The bearing counter gate 52 is disabled and the 12 mHz. signal is disconnected from the counter. The number of clock cycles counted in the counter 53 is a measure of the elapsed time between the zero crossings of the vector direction signal on line 39 and the reference bearing signal 40. Since the 12 mHz. clock signals have 360 times the modulation frequency applied to the reference signal zero detector, each cycle counted by counter 53 represents one compass degree of direction. The aircraft heading formatter 48 converts aircraft heading into a signal which can be added algebraically to the bearing count in bearing translator 54.

When the toggle flip-flop sets the flip-flop gate 51, the R.F. flip-flop 55 is also set. The output of flip-flop 55 disables the amplitude-hold circuits in the signal processor 12 by line Y. This prevents other signals from having effect until the count is complete and the bearing counter cleared.

The gate flip-flop 51 also provides an output to trigger a delay one-shot multivibrator 56 at the same time that it enables the bearing counter gate 52. This provides a delay which is slightly longer than the maximum bearing count duration. Thus sufficient time is allowed for the counter to stabilize and for the comparator 58 to compare new bearing information on line 59 from counter 53 with data already stored in the bearing register 60 provided that it is desired to preclude storage of the information on successive computation. When the delay one-shot returns to zero, the transfer one-shot 57 is triggered to produce a short duration output pulse which is applied to reset the toggle flip-flop 50. It also is applied to trigger the one-shot reset 62, trigger a four input transfer gate 63 and also is used, as hereinafter explained, to provide set and reset pulses in the pulse repetition period formatter 41.

The reset one-shot multivibrator 62 provides a short duration pulse to sequencer 46, to the reset input of the R.F. flip-flop 55, and to the reset inputs of the bearing counter 53 and a counter 64 in the pulse width formatter 42.

The transfer gate 63 requires four inputs before it will apply its output signal to the bearing register 60 permitting the bearing data or count in the bearing translator 54 to be transferred to the bearing register 60. One is an input on line 66 indicating that the pulse repetition period formatter is not counting. Another is an input on line 67 from a shift flip-flop in the sequencer 46. A third input is required by line 68 from the comparator to show that new data does not correspond to data already in the bearing register. Finally, as previously the fourth signal is required from the transfer one-shot 57. When all these input requirements are satisfied, the transfer gate 63 triggers the bearing register and the new bearing data into storage in register 60.

Each bearing register is combined with a comparator which forms an inhibit circuit to prevent the numerous pulses from a single source from filling the storage registers on the first intercept. When the bearing counter develops the count for each new signal, each comparator compares this data with the data stored in its corresponding bearing register. Since bearing is the criterion for similarity, the bearing formatter will control storage of all other infromation. If the comparison indicates similarity, the comparator provides a ground disable signal to the associated transfer gate, preventing transfer of the information into that bearing register. If the comparison does not indicate similarity, the comparator output is positive, satisfying one of the four transfer gate requirements. When the other three transfer gate requirements are satisfied, the corresponding bearing register will be triggered and the data will be transferred into storage.

The pulse width of the intercepted signal is determined by measuring the duration of the original pulse envelope prior to pulse stretching. The pulse supplied by line 29 from the summing network 28 in the signal processor 12 is processed to provide sharp sides and sufficient driving power. This signal enables the pulse width counter gate 70. This gate couples the output of a 10 mHz. oscillator 71 to a two-decade counter 64. Since the oscillator 71 provides 0.1-microsecond pulses, the pulse width counter will measure pulse widths up to 9.9 microseconds. The output of the counter 64 is connected to pulse width register 72 when the output signal of transfer gate 63 in the bearing formatter 16 applies its output to register 72 by the line 73. By this means the pulse width data is made to remain in the pulse width counter 64 until the bearing count in the bearing formatter 16 is complete and the comparator 58 permits gate 63 to transmit the transfer signal. Information is stored in the register 72 until transferred to the recorder by gate 74 on command of the sequencer 46.

Returning to the upper portion of FIGURE 2, the pulse repetition period formatter 41 requires two pulses of received signal to determine repetition period. In the clock 44 an initial 12 mHz. generator 75 is connected to a divider 76. The divider 76 provides one output on line 77 at 33.33 kHz. which is the modulation signal previously described. Another output from divider 76, at 1 mHz., is applied by line 78 to a gate 79 whose output is applied to a pulse repetition period counter 80 in the formatter 41. Thus, the clock provides 1.0 microsecond pulses to the PRP formatter 41. Counter 80 is a four decade unit. Only the three most significant digits are recorded to provide a measurement of PRP up to 9.99 milliseconds. On signal from the sequencer 46, the count stored in unit 80 is transferred by gates 81 to the recorder 22 on command of the sequencer 46.

Gate 79 is opened to permit pulses from the clock to pass to counter 80, and it is closed when counting has ceased by a PRP, pulse repetition period, flip-flop 82. This flip-flop receives a turn-on signal from a set gate 83, and it receives a turn-off signal from a reset gate 84. When the comparator 58 recognizes that a new signal has been introduced into the bearing register 60, its output will be positive. This will enable set gate 83 and it will disable reset gate 84 because the signal is applied to the reset gate through an inverter 85. A gate 86, which appears ahead of the set and reset gates, was previously enabled by the signal applied to line 67 by shift flip-flop 87 of the sequencer 46. Accordingly, the output of transfer one-shot 57 is applied through gate 86 and set gate 83 to actuate flip-flop 82 to turn on gate 79. When the comparator 58 recognizes that the signal in bearing register 60 is similar to an incoming signal, its output is at ground potential. This will disable he set gate and enable the reset gate. In this case gate 86 output pulses pass by the reset gate. They will reset the PRP flip-flop 82 disabling gate 79 so that signals are not passed to the counter 80. Instead flip-flop 82 sets the shift flip-flop 87 in the sequencer 46 removing the signal from line 67 and disabling gate 86. This prevents new data from entering the bearing register 60, or pulse width register 72, or PRP counter 80 until the old data has been shifted out to the record.

The frequency formatter 43 and the real time formatter 47 receive external inputs defining frequency and real time respectively. Their outputs are applied to the recorder 20 when directed by the sequencer 46.

The data accumulated in sequence gates 69, 74 and 81 of the data processor is transferred to the recorder 20 by a single terminal output line 88 upon command of a gate sequencer shift register 89. Initially the shift register 89 contains all ZEROS. The reset one-shot 62 output pulse sets a ONE in the first position of the gate sequencer shift register. In the clock 44 a divide-by-two unit 90 divides the 1 mHz. clock signal to provide 500 kHz. shift clock signals to a shift gate 91 in the sequencer 46. When this shift gate is enabled by the flip-flop 87, the 500 kHz. clock signal is allowed to pass through the shift gate 91 and the register driver 92 to the shift register 89 where the one is made to pass in sequence through the various stages successively enabling the sequence gates of the several formatters. The shift register driver 92 also provides the signal necessary to advance the shift counter 93. The shift counter provides an output pulse at the end of a number of counts equal to the number of bits in each complete data set. This output pulse resets the shift flip-flop 87 to disable the shift gate 91 and stop the advance of the gate sequencer shift register 89.

The video amplifier and threshold detector 21 of the signal conditioner 12 comprises four circuits of the kind shown in FIGURE 3, one for the connection to each of the antennas. The circuit comprises an input 100 for connection to the respectively associated antenna. The input is connected to a positive detector 101 and a negative detector 102 in parallel. The output of the positive detector 101 is amplified in the video amplifier 103 whose output is applied to one input terminal of differential amplifier 105. The output of the negative detector 102 is amplified in an amplifier 106 whose output is applied to the other input terminal of the differential amplifier 105. The output of the differential amplifier appears across two output terminals which are connected to input terminals 2 and 3 of a microcircuit chip type 710 designated by the numeral 107. A peak detector 104 is included in the line between the negative output terminal of differential amplifier 105 and input terminal 3 of the microcircuit 107. The signal outputs of amplifiers 106 and 103 have opposite polarity. Applied to the differential amplifier the effect is to add the received signals derived from the antenna signal. The noise in the output of the two amplifiers is also added. However, there will be no coherence between the noise signals in the two amplifiers. Lacking coherence much of the noise will be cancelled in the differential amplifier. The differential amplifier output applied to terminal 2 of the microcircuit 107 includes the positive going antenna signal and whatever component of noise remains. The signal applied by the differential amplifier 105 to the peak detector 104 includes a negative going antenna signal and component of noise. Peak detector 104 will provide an output signal whose level is determined only by the noise component. This is because the negative going antenna signal is rejected in the peak detection process. Microcircuit 107 is an amplifier in which signals applied to terminal 2 are amplified to the extent that they exceed the magnitude of the threshold signal applied by detector 104 to terminal 3. The result is to provide, at output terminal 7 and output line 108, a unidirectional signal whose magnitude represents the strength of the signal arriving at the antenna to which the amplifier and threshold detector circuit is connected.

The peak detector and pulse stretch unit 23 of the signal processor 12 comprises four circuits of the type shown in FIGURE 4. The output signal from comparator 107, applied through line 108, is developed across an input resistor 109 and is applied to the input terminal 2 of a microcircuit chip type 710. A reset signal is applied to terminal 3 through a coupling resistor 110 from a gate connected to terminal 111. The output of the chip 112 is applied through a coupling resistor 113 to the base of a transistor 114 whose collector is tied to B+ and whose emitter is connected to the output terminal 115. The emitter is also connected to ground through a capacitor 151 and it is connected by a feedback line 116 to the input terminal 3 of chip 112.

A zero crossing detector is shown in FIGURE 6. An alternating input signal is applied to the input terminal 117 and, through a coupling capacitor 118, is applied to the input terminal 3 of a microcircuit chip type 710. The input terminal 2 is grounded and resistors 119 and 120 form a network for applying positive bias to input terminal 3. The output, taken at terminal 6, appears on line 121 as a pulse which occurs when the input signal applied to terminal 3 crosses zero volts going from a negative to a positive value.

FIGURE 5 shows a circuit comprising five chips. Beginning at the left in FIGURE 5, the first three chips comprise a modulator. Four such modulators are employed as modulators I, II, III and IV of the angle resolver 10. The fourth chip from the left in FIGURE 5 is part of an inverter circuit such as is employed in inverter 30 and inverter 31 of the angle resolver 10 of FIGURE 1. The chip at the right in FIGURE 5 is connected in a summer circuit like summers 32, 33 and 34 of the angle resolver 10.

The input signal is applied to input terminal 122 of the modulator which is connected to terminal 3 of each of two microcircuit chips type CA3005. The signal to be modulated is the 33.33 kHz. signal from master clock 44. It will be modulated by the pulse output from peak detector and pulse stretcher 23. The pulse output from peak detector and pulse stretcher 23 is a square wave derived from a signal received from one of the antennas. The modulators are arranged so that their output is a sine wave of master clock frequency which exists only during the period of pulse stretcher 23 output and at other times is zero.

The clock signal, which has hereinbefore been called the modulated signal, is applied to terminal 1 of one of the chips, designated 123, by an input terminal 124. The output of chip 123 is applied to terminal 3, and the output of the other chip 125 is applied to the input terminal 4, of a microcircuit chip type CA3008 designated 126. The output of chip 126 is applied to input terminal 3 of a similar chip type CA3008 numbered 127.

Chips 123 and 125 are amplifiers of the type whose gain is variable with the signal applied at the respective input terminals 3. In the absence of a signal at input terminals 3 of these two amplifiers their outputs are both zero. The clock or modulated input signal applied to terminal 124 to input terminal 1 of chip 123 results in no output from that amplifier. However, when a signal is applied at input terminal 122 and thus to input terminals 3 of chip 123 and 125, amplifier 123 has its gain changed sufficiently to permit the clock signal to appear at its output terminal 10. That signal is applied to input terminal 3 of chip 126 which comprises a differential amplifier. There being no counter signal the clock signal or modulated signal, appears in amplified form at the output terminal 12 of chip 126. It is desired that none of the modulating signal appearing at input terminal 122 is applied to the two amplifiers 123 and 125. If amplified equally in these two amplifiers, the signal is cancelled in differential amplifier 126.

Output terminal 12 of chip 126 is connected to the input terminal 3 of chip 127 where the signal is inverted. The output of this chip is applied to a resistor 128 through which it is applied to input terminal 3 of a chip type CA3008 numbered 129 along with the output from a similar modulator applied by input terminal 130 and a resistor 131 to the same input terminal number 3 of chip 129. The output chip 129 appears on line 132 as the sum of the modulated signals from the modulator and inverter shown and from another similar modulator.

The PRP counter is started and stopped by pulses from one-shot 57 through gate 86 and either gate 83 or 84, at a time determined by the second zero crossing of the vector-sum signal. In one embodiment this second zero crossing can occur at either of two specific times 30 microseconds apart, dependent on the time occurrence of the incoming pulse and the instantaneous phase of the reference signal. As a result, the PRP count can be in error by plus or minus 30 microseconds or plus or minus one half cycle plus any inherent error of the counter.

An alternative arrangement accepts the PW signal 29 and applies it to a delay of 75 microseconds plus a safety period of one or two microseconds. This delayed pulse now replaces the input to gate 86 that previously came from one-shot 57. Since the PRP counter is now started and stopped by incoming signal pulses, each delayed a fixed time period, the only error is that inherent in the PRP counter.

Although we have shown and described certain specific embodiments of our invention, we are fully aware that many modifications thereof are possible. Our invention, therefore, is not to be restricted except insofar as is necessitated by the prior art and by the spirit of the appended claims.

We claim:

1. An angle resolver for determining, from an electromagnetic signal received in one or more of four quadrantal directions, the direction from the place of receipt to the source of said signals, comprising:
   means for representing any signal received from one of said directions as a pulse whose amplitude is a function of the amplitude of the received signal;
   means for providing four alternating signals of like frequency associated with said quadrants respectively, the phase of alternating signals associated with two opposite quadrants differing by ninety electrical degrees from that of the other two alternating signals and one hundred eighty electrical degrees from one another;
   means for modulating each of said alternating signals by pulses derived from signals received from their respectively associated quadrants to produce modulated signals;
   means for summing the modulated signals to produce a composite modulated signal; and
   means for ascertaining the phase relation between the modulation component of said composite signal and said alternating signals.

2. The invention defined in claim 1 which includes means for inverting the modulated signals representing one pair only of adjacent quadrants prior to summing.

3. The invention defined in claim 1 in which said means for ascertaining the phase relation comprises a zero crossing detector subjected to said composite signal and another zero crossing detector subjected to a reference alternating signal like said alternating signals and having known phase relation to said alternating signals, and means for determining the time difference between detection of crossing in said zero crossing detectors.

4. The invention defined in claim 1 including antenna means for providing, for each quadrant thereabout in a plane, a signal representing signals received from a direction in said quadrant.

5. The invention defined in claim 4 in which said antenna means comprises an antenna, rectifier means for providing separately positive and negative signals derived from received signals, means for amplifying said positive and negative signals, means for detecting the peak value and for inverting one of said positive and negative signals, and means for subtracting the other signal and the detected and inverted signal one from the other.

6. A signal evaluation system comprising:
   antenna means for providing for each quadrant thereabout in a plane, antenna signals representing the magnitude at that quadrant of electromagnetic signals emanating from a distant point;
   summation means responsive to said antenna signals to provide a summation signal representing the composite of said antenna signals;
   means responsive to said summation signal by storing information defining the duration of said summation signal;
   angle resolver means responsive to said antenna signals for providing a direction signal indicative by its duration of the vector sum in said plane of said antenna signals;
   means for storing direction information defining the duration of said direction signal;
   means for comparing currently stored direction information with previously stored direction information to provide a correspondence signal indicating correspondence;
   and means responsive to successive direction signals and to said correspondence signal to determine and store information defining the repetition period of said electromagnetic signals.

7. The invention defined in claim 6 in which said angle resolver includes means effective for the duration of said direction signal for preventing the provision of antenna signals.

8. The invention defined in claim 6 in which said angle resolver means comprises:
   means for representing any signal received from each of said directions as a pulse signal;
   means for providing four alternating signals of like frequency associated with said quadrants respectively, the phase of alternating signals associated with two opposite quadrants differing by ninety electrical degrees from that of the other two alternating signals;

means for modulating each of said alternating signals by pulses derived from signals received from their respectively associated quadrants to produce modulated signals;

means for summing the modulated signals to produce a composite modulated signal; and means for ascertaining the phase relation between the modulation component of said composite signal and said modulation signals as a time duration.

9. The invention defined in claim 8 in which said angle resolver further comprises means for inverting the modulated signals representing one pair only of adjacent quadrants prior to summing.

10. The invention defined in claim 6 including means rendered operative by said summation signal for receiving signals from the source of said electromagnetic signals, and determining and storing information defining the frequency of said electromagnetic signals.

11. The invention defined in claim 8 in which said means for ascertaining the phase relation between the modulation component of said composite signal and said modulation signals as a time duration comprises, clock means for providing clock signals at a frequency higher by a selected amount than the frequency of said alternating signals, and means for counting the number of said clock signals occurring in the period between incidence of like points in the modulation component of said composite signal and a reference signal having the frequency of, and known phase relation to, said modulation signals.

12. The invention defined in claim 11 in which said clocks signals have a frequency 360 times greater than that of said reference signal.

13. The invention defined in claim 6 in which said angle resolver means comprises:

means for representing any signal received from each of said directions as a pulse signal;

means for providing four alternating signals of like frequency associated with said quadrants respectively, the phase of alternating signals associated with two opposite quadrants differing by ninety electrical degrees from that of the other two alternating signals;

means for modulating each of said alternating signals by pulses derived from signals received from their respectively associated quadrants to produce modulated signals;

means for summing the modulated signals to produce a composite modulated signal; and means for ascertaining the phase relation between the modulation component of said composite signal and said modulation signals, including a first zero crossing detector subject to said composite signal and a second zero crossing detector subject to a reference modulation signal having known phase relation to said modulation signals; and in which said means for storing direction information includes a flip-flop toggle, a flip-flop gate, a clock pulse generating clock, an AND gate, a pulse counter, a means for adding pulse counts representing directional orientation of said antenna means, a pulse register, and a delay one shot pulser, the output of said first zero crossing detector being connected to trigger said toggle, said second zero crossing detector having its output connected to one input of said flip-flop gate. The controlled output of said toggle being connected to the other input of said flip-flop gate, the output of said clock and the output of said flip-flop gate being connected to the inputs respectively of said AND gate the output of which is connected to the input of said counter, the output of said counter being connected through said means for subtracting pulse counts to said register, said output of said gate flip-flop also being connected to said delay one shot, and the output of said delay one shot being connected to the reset input of said toggle.

14. The invention defined in claim 12 including means responsive to signals from said delay one shot pulser for releasing from storage the information defining the duration of the summing signal and the duration of the direction signal and the repetition period of said electromagnetic signal.

15. The invention defined in claim 4 in which said antenna means comprises an antenna; a pair of video detectors, one for detecting positive and the other for detecting negative half cycles of the antenna signal output; a first differential amplifier connected to provide positive and negative signals corresponding to the difference in the output of said video detectors; a second differential amplifier for providing an output signal corresponding to the difference in signals applied thereto; a peak detector; and means for connecting the outputs of said differential amplifier to the inputs of the second differential amplifier, the negative output line from the first differential amplifier being connected through said peak detector.

References Cited

UNITED STATES PATENTS 3,108,251 10/1963 Corbett _____ 343—121 X

RODNEY D. BENNETT, *Primary Examiner.*

R. E. BERGER, *Assistant Examiner.*

U.S. Cl. X.R.

343—113